(12) United States Patent
Allen et al.

(10) Patent No.: US 11,060,691 B2
(45) Date of Patent: Jul. 13, 2021

(54) LIGHT BAR AND EXTERIOR LIGHTING ASSEMBLY FOR AN AUTOMOTIVE VEHICLE COMPRISING THE SAME

(71) Applicant: GM GLOBAL TECHNOLOGY OPERATIONS LLC, Detroit, MI (US)

(72) Inventors: Jodi M. Allen, Orion, MI (US); Dave W. Heyne, Royal Oak, MI (US); Jonglee Park, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 16/688,549

(22) Filed: Nov. 19, 2019

(65) Prior Publication Data

US 2021/0148538 A1     May 20, 2021

(51) Int. Cl.

| | |
|---|---|
| *F21S 43/50* | (2018.01) |
| *F21S 41/20* | (2018.01) |
| *F21S 41/151* | (2018.01) |
| *F21S 41/365* | (2018.01) |
| *F21S 41/32* | (2018.01) |
| *F21S 43/14* | (2018.01) |
| *F21S 43/15* | (2018.01) |

(Continued)

(52) U.S. Cl.
CPC ............. *F21S 43/50* (2018.01); *F21S 41/151* (2018.01); *F21S 41/285* (2018.01); *F21S 41/321* (2018.01); *F21S 41/365* (2018.01); *F21S 41/50* (2018.01); *F21S 43/14* (2018.01); *F21S 43/15* (2018.01); *F21S 43/26* (2018.01); *F21S 43/31* (2018.01); *G02B 6/0006* (2013.01); *F21W 2103/10* (2018.01); *F21W 2103/20* (2018.01); *F21W 2103/35* (2018.01); *F21W 2103/45* (2018.01); *F21W 2103/55* (2018.01); *F21W 2104/00* (2018.01)

(58) Field of Classification Search
CPC ........ F21S 43/239; F21S 43/245; F21S 41/24; F21S 41/50; G02B 6/004; G02B 6/006; B60Q 1/0011; B60Q 1/28; B60Q 1/32; B29C 39/10; B60R 13/005; G09F 13/08; G09F 2013/184; G09F 2013/1854; G09F 2013/1863; G09F 2013/1886; G09F 2013/189

See application file for complete search history.

(56) References Cited

U.S. PATENT DOCUMENTS 5,269,977 A * 12/1993 Nakahashi ............ B29C 39/006
                                                          264/1.1
5,613,751 A *  3/1997 Parker .................. G02B 6/0018
                                                         362/23.16

(Continued)

*Primary Examiner* — Rajarshi Chakraborty
*Assistant Examiner* — Steven Y Horikoshi
(74) *Attorney, Agent, or Firm* — Quinn IP Law (57) ABSTRACT

A light bar for an exterior lighting assembly of an automotive vehicle includes a body portion and an ornamental element. The body portion is made of a substantially transparent material and has a generally slab-like shape with an average height H in a z-direction, an average width W in a y-direction and an average thickness T in an x-direction, wherein the x-, y- and z-directions are mutually orthogonal and H>W>T. The ornamental element is disposed within the body portion and has an outer surface, wherein at least a portion of the outer surface contains a light-scattering material.

20 Claims, 7 Drawing Sheets

(51) Int. Cl.

| | |
|---|---|
| *F21S 43/20* | (2018.01) |
| *F21S 43/31* | (2018.01) |
| *F21S 41/50* | (2018.01) |
| *F21V 8/00* | (2006.01) |
| *F21W 103/55* | (2018.01) |
| *F21W 104/00* | (2018.01) |
| *F21W 103/35* | (2018.01) |
| *F21W 103/20* | (2018.01) |
| *F21W 103/45* | (2018.01) |
| *F21W 103/10* | (2018.01) |

(56) References Cited

U.S. PATENT DOCUMENTS

| | | | | |
|---|---|---|---|---|
| 5,995,288 | A * | 11/1999 | Kashima | G02B 5/045 |
| | | | | 359/599 |
| 2002/0101549 | A1* | 8/2002 | Katsu | G02B 6/0031 |
| | | | | 349/65 |
| 2005/0259939 | A1* | 11/2005 | Rinko | G02B 6/0076 |
| | | | | 385/146 |
| 2007/0098969 | A1* | 5/2007 | Ansems | B32B 17/10761 |
| | | | | 428/212 |
| 2011/0176325 | A1* | 7/2011 | Sherman | G02B 6/0045 |
| | | | | 362/551 |
| 2011/0228553 | A1* | 9/2011 | Igoe | B60Q 3/217 |
| | | | | 362/558 |
| 2011/0310610 | A1* | 12/2011 | Brown | B60Q 1/56 |
| | | | | 362/253 |
| 2013/0094205 | A1* | 4/2013 | Schwab | B60Q 3/64 |
| | | | | 362/231 |
| 2014/0003075 | A1* | 1/2014 | Yamada | B60Q 1/0035 |
| | | | | 362/511 |
| 2018/0086028 | A1* | 3/2018 | Berard | B60Q 1/302 |
| 2018/0274747 | A1* | 9/2018 | Wiesner | F21S 43/255 |

\* cited by examiner

LIGHT BAR AND EXTERIOR LIGHTING ASSEMBLY FOR AN AUTOMOTIVE VEHICLE COMPRISING THE SAME

INTRODUCTION

This disclosure relates generally to light bars for exterior lighting assemblies of automotive vehicles and methods of forming such light bars.

Automotive vehicles are typically required to have various exterior lights, such as headlights, brake lights, turn signal lights, parking/front position lights and reverse lights. Some vehicles also have daytime running lights (DRLs) as well, which may automatically turn on whenever the vehicle's engine is turned on. DRLs may be lights that are separate from and in addition to the other aforementioned lights, or the headlights may be used as DRLs. In this latter case, the headlights may serve in two modes. One of these is the "normal" headlight mode in which the headlights may be engaged by the driver to emit low-beam or high-beam light. The other is a "DRL" mode in which the high-beams are engaged, but at a lower-than-normal power level.

Some vehicles have separate DRL lights, which may include light bars illuminated by light-emitting diodes (LEDs), high-intensity discharge (HID) lamps or the like.

SUMMARY

According to one embodiment, a light bar includes a body portion made of a substantially transparent material and having a generally slab-like shape with an average height H in a z-direction, an average width W in a y-direction and an average thickness T in an x-direction wherein the x-, y- and z-directions are mutually orthogonal and H>W>T, and an ornamental element disposed within the body portion and having an outer surface, wherein at least a portion of the outer surface contains a light-scattering material. The substantially transparent material may be at least one of a polycarbonate, a polymethylmethacrylate and an acrylic, and the light-scattering material may be at least one of talc, titanium dioxide, styrene-acrylonitrile, polyethylene terephthalate, and a combination of any of the foregoing and at least one of polycarbonate and polymethylmethacrylate. The light bar may be configured for use in an exterior lighting assembly of an automotive vehicle, wherein the exterior lighting assembly may be at least one of a headlight assembly, a brake light assembly, a turn signal light assembly, a reverse light assembly, a parking/front position light assembly and a daytime running light assembly. The body portion may be at least one of clear and colored. Substantially all of the ornamental element may be made of the light-scattering material, and the at least a portion of the outer surface may face generally in the x-direction.

The body portion may have opposed upper and lower ends in the z-direction, and the light bar may further include a first wing portion made of the substantially transparent material and having a first longitudinal axis and opposed first and second ends along the first longitudinal axis, wherein the first end is contiguous with the upper end and the first longitudinal axis is disposed generally in the x-direction. The light bar may further include a second wing portion made of the substantially transparent material and having a second longitudinal axis and opposed third and fourth ends along the second longitudinal axis, wherein the third end is contiguous with the lower end and the second longitudinal axis is disposed generally in the x-direction. The light bar may be produced by a multi-shot molding process, and the light bar may be configured such that when light rays are directed into the body portion toward the ornamental element, a subset of the light rays are incident upon the ornamental element and are scattered so as to cause the ornamental element to appear brighter than the substantially transparent material surrounding the ornamental element.

According to one embodiment, an exterior lighting assembly for an automotive vehicle includes a housing, a light bar and a light source. The light bar is attached to the housing and includes a body portion made of a substantially transparent material and having a generally slab-like shape with an average height H in a z-direction, an average width W in a y-direction and an average thickness T in an x-direction wherein the x-, y- and z-directions are mutually orthogonal and H>W>T, and an ornamental element disposed within the body portion and having an outer surface, wherein at least a portion of the outer surface contains a light-scattering material. The light source is attached to the housing and is configured to emit visible light into the body portion. The exterior lighting assembly may be at least one of a headlight assembly, a brake light assembly, a turn signal light assembly, a reverse light assembly, a parking/front position light assembly and a daytime running light assembly. The body portion may have opposed upper and lower ends in the z-direction, and the light bar may further include a first wing portion made of the substantially transparent material and having a first longitudinal axis and opposed first and second ends along the first longitudinal axis, wherein the first end is contiguous with the upper end and the first longitudinal axis is disposed generally in the x-direction. Substantially all of the ornamental element may be made of the light-scattering material, and the light bar may be produced by a multi-shot molding process. The light bar may be configured such that when light rays are directed by the light source into the body portion toward the ornamental element, a subset of the light rays are incident upon the ornamental element and are scattered so as to cause the ornamental element to appear brighter than the substantially transparent material surrounding the ornamental element.

According to one embodiment, a method of forming a light bar includes: (a) injecting a first shot of a substantially transparent material into a mold to form a first layer of the substantially transparent material, wherein the first layer has a first major surface and an outer perimeter about the first major surface; (b) disposing an ornamental element on the first major surface within the outer perimeter, the ornamental element having an outer surface wherein at least a portion of the outer surface contains a light-scattering material; and (c) injecting a second shot of the substantially transparent material into the mold to form a second layer of the substantially transparent material covering the ornamental element and in contact with the first major surface. The disposing step may include injecting a shot of the light-scattering material into the mold to form the ornamental element. Alternatively, the disposing step may include placing the ornamental element in solid form on the first major surface within the outer perimeter, wherein the ornamental element is formed separately from the mold. The light bar may be configured for use in an exterior lighting assembly for an automotive vehicle, wherein the exterior lighting assembly is at least one of a headlight assembly, a brake light assembly, a turn signal light assembly, a reverse light assembly, a parking/front position light assembly and a daytime running light assembly.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

As used herein, "FIG. 4" refers to FIGS. 4A and 4B collectively, "FIG. 5" refers to FIGS. 5A, 5B and 5C collectively; "FIG. 9" refers to FIGS. 9A, 9B and 9C collectively; "FIG. 10" refers to FIGS. 10A, 10B and 10C collectively; and "FIG. 11" refers to FIGS. 11A and 11B collectively.

DETAILED DESCRIPTION

Referring now to the drawings, wherein like numerals indicate like parts in the several views, a light bar 32 for an exterior lighting assembly (ELA) 20 of an automotive vehicle 10, and a method 100, 200 for making the light bar 32, are shown and described herein.

Figure 1:
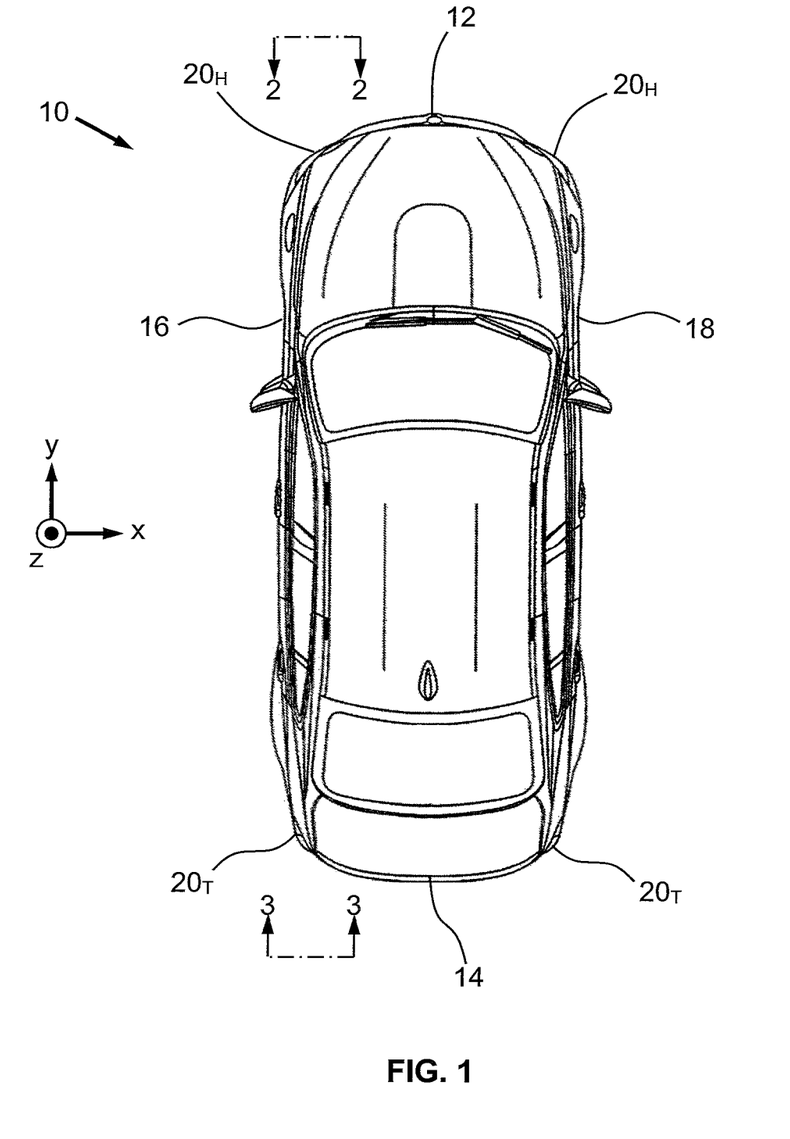
FIG. 1 is a top schematic view of an automotive vehicle having exterior lighting assemblies.

FIG. 1 shows a top schematic view of an automotive vehicle 10 having multiple ELAs 20. Note that in the drawings and in the present description, reference numeral $20_H$ refers to a headlight ELA, reference numeral $20_T$ refers to a taillight ELA, and reference numeral 20 (without a subscript) may refer to either or both types of ELAs. An ELA may include a headlight assembly, a brake light assembly, a turn signal light assembly, a reverse light assembly, a parking/front position light assembly and/or a daytime running light (DRL) assembly. The front 12 of the vehicle 10 has two headlight ELAs $20_H$ (one toward the left side 16 of the vehicle 10 and one toward the right side 18), and the rear 14 has two taillight ELAs $20_T$ (likewise toward the respective left and right sides 16, 18). As is evident from the description below, a light bar 32 according to the present disclosure may be used in a headlight ELA $20_H$ or a taillight ELA $20_T$. (Note that as used herein, "front", "rear", "left" and "right" may refer to respective parts 12, 14, 16, 18 of a vehicle 10, or to corresponding areas outside the vehicle 10. For example, "in front" of a vehicle 10 may refer to a perspective or view taken from a point standing some distance away from the "front 12" of the vehicle 10 but looking rearward toward the "front 12" of the vehicle 10.)

Figure 2:
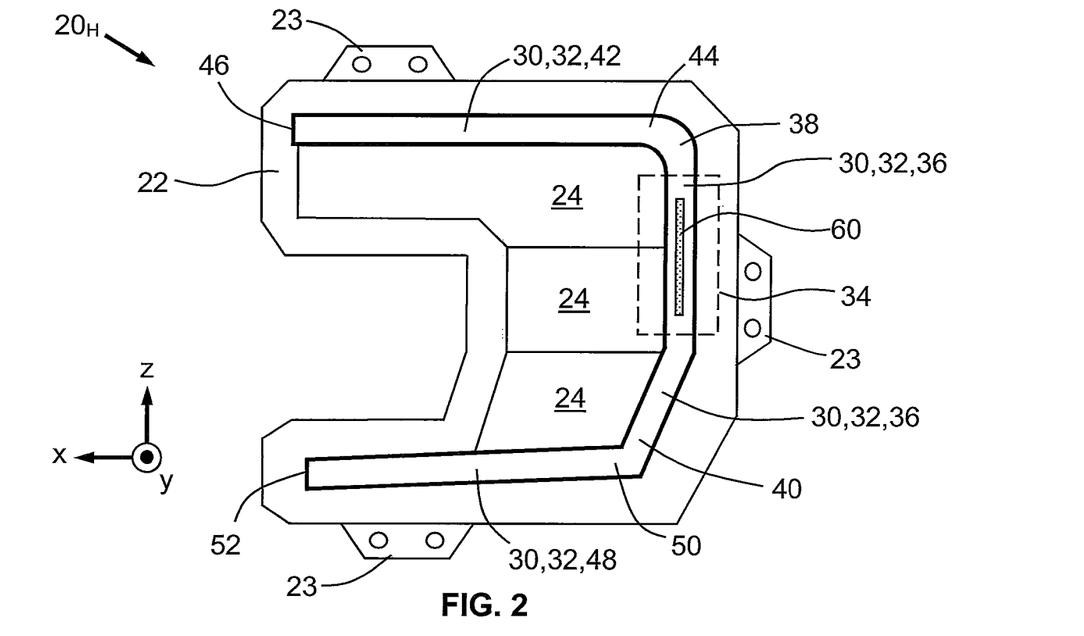
FIG. 2 is a front schematic view of a headlight exterior lighting assembly as viewed along line 2-2 of FIG. 1.

FIG. 2 shows a front schematic view of a headlight ELA $20_H$, which includes a housing 22, one or more headlights or headlamps 24 (e.g., low and high beams), a light bar 32 and various mounting brackets 23. Although not shown in this view, the headlight ELA $20_H$ may also include a turn signal light. In the configuration shown, the light bar 32 may serve as a DRL 30, but note that the light bar 32 may also be used as part of or in conjunction with the headlights 24, the turn signal, the parking/front position light or as a decorative feature. In the configurations described in the present disclosure, the light bar 32 includes a body portion 36 made of a substantially transparent material and having a generally "slab-like" shape which may extend outward from the ELA 20 of which the light bar 32 is a part. (As used herein, a "slab" is defined as an element having a generally rectangular prism shape whose thickness is smaller, and may be much smaller, than its height and width, such as a rectangular prism that is 5 inches in height, 3 inches in width and one-half inch in thickness. Thus, a "generally slab-like shape" may include a rectangular prism shape whose thickness is less than its height and its width, as well as shapes whose cross-sectional area may vary from strictly rectangular, such as trapezoidal, generally rectangular/trapezoidal shapes having one or more rounded corners, bullet-shaped, etc.) For example, when the light bar 32 is part of a headlight ELA $20_H$ installed on a vehicle 10, the slab-like shape of the light bar 32 will jut or extend forward, and when the light bar 32 is part of a taillight ELA $20_T$ installed on a vehicle 10, the slab-like shape of the light bar 32 will jut or extend rearward/aftward. Referring to the conventional and mutually orthogonal x-, y- and z-directions shown in the drawings (where the x-direction points rightward, the y-direction points forward and the z-direction points upward with respect to a vehicle 10), the slab-like shape of the body portion 36 of the light bar 32 has an average height H as measured in the upward/downward or z-direction, an average width W as measured in the forward/rearward or y-direction, and an average thickness T as measured in the leftward/rightward or x-direction, wherein H>W>T. In other words, the slab-like shape of the body portion 36 is relatively thin (in the x-direction) as compared to the shape's height and width measurements H, W, and the height (or length) H of the body portion 36 is greater than the width W. Note that while the body portion 36 is illustrated in the drawings as having a generally rectangular cross-sectional profile which appears uniform or unchanging along the height H or z-direction (e.g., like a rectangular prism), this is for illustration purposes only, as the profile may assume other shapes as well and may vary in shape along the height H or z-direction.

The substantially transparent material used in the body portion 36 may be a polymer that is either clear (e.g., like window glass) or colored (e.g., red, amber or yellow). Suitable polymers for the substantially transparent material include polycarbonates (PCs), polymethylmethacrylates (PMMAs), acrylics or the like. The polymer in its pre-molding form (e.g., pellets) does not have to be substantially transparent, but the polymer should provide a substantially transparent appearance to the as-molded or finished part. As used herein, "substantially transparent" describes a material that allows light to pass through it without being significantly scattered; in other words, most or all of the light rays passing into the material will continue on substantially the same path through the material with little or no deviation therefrom. Materials that exhibit such substantially transparent character include glass, PCs, PMMAs and PC/PMMA blends. In contrast, a "light-scattering" material means a material that scatters or occludes light rays within the material; that is, light rays entering into such a material will bounce and deviate significantly as it passes through the material, and will typically exit the material in a significantly different direction from the direction of entry into the material. Examples of light-scattering materials include talc, titanium dioxide, styrene-acrylonitrile (SAN), polyethylene terephthalate (PET), and any combinations of the foregoing with PC, PMMA or PC/PMMA.

Figure 4A:
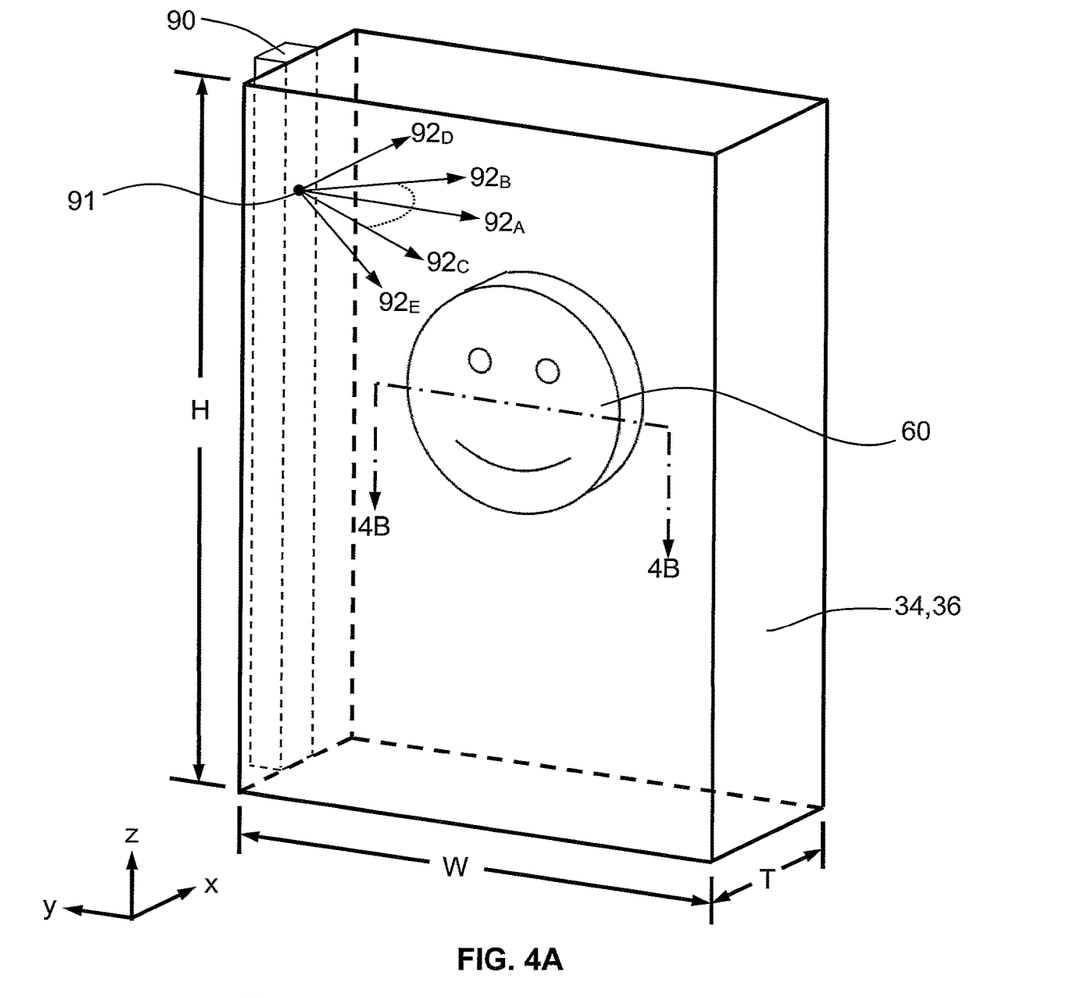
FIG. 4A is a perspective schematic view of a segment of a light bar.

Although not shown in FIG. 2, the ELA $20_H$ also includes a light source 90 which emits visible light into the light bar 32. For example, as illustrated in FIGS. 4-5 where a selected segment 34 of the body portion 36 is shown, one or more light sources 90 may be disposed proximate an edge of the body portion 36, so that light 92 may be transmitted into and through the light bar 32. The light source 90 may be a line source as shown in FIG. 4, or it may be a collection of spot sources 90 (e.g., individual light-emitting diodes or LEDs) as shown in FIG. 5, or any other suitable arrangement, including the use of light pipes, light blades, fiber optic elements, reflectors/directors 98 and the like interposed between the light source 90 and the surface of the light bar 32. In the configuration shown in FIG. 4A, visible light would be emitted into the body portion 36 by the line source 90 all along the height H of the line source 90, but for illustration purposes FIG. 4A only shows selected light beams or rays 92 emanating from a single point 91. Rays $92_A$, $92_B$ and $92_C$ are directed in the horizontal (x-y) plane, with $92_A$ directed in the negative y-direction, $92_B$ directed in the negative y-direction and positive x-direction, and $92_C$ directed in the negative y- and x-directions. Ray $92_D$ is directed "above" the plane of $92_A$, $92_B$ and $92_C$ in the negative y-direction and positive z-direction, and ray $92_E$ is directed "below" the aforementioned plane in the negative y- and z-directions. (Note that in the drawings and in the present description, reference numerals $92_A$, $92_B$, $92_C$, $92_D$, $92_E$, 94, 95, 96 and 97 refer to specific light beams or rays, while reference numeral 92 (without a subscript) may refer to any or all of these light beams or rays.)

As shown in FIGS. 2-6, the light bar 32 also includes an ornamental element 60 disposed within the body portion 36. The ornamental element 60 has an outer surface 62, wherein at least a portion (i.e., some or all) of the outer surface 62 contains a light-scattering material. In addition to the outer surface 62 containing light-scattering material, some or all of the interior 64 of the ornamental element 60 may also be made out of light-scattering material. (Alternatively, the interior 64 of the ornamental element 60 may be made of PC, PMMA, PC/PMMA or some other suitable substantially transparent material, such as the same material used to make the body portion 36. Or, as a further alternative, the interior 64 may be made of a translucent or opaque material, such as a black or colored polymer, for aesthetic purposes.) The ornamental element 60 may be dimensioned and oriented within the body portion 36 such that the portion of the outer surface 62 which contains the light-scattering material faces generally in the x-direction.

The ornamental element 60 may be an aesthetic or expressive element, and may assume the form of a logo, an emblem, a badge, a symbol, a characteristic shape, or any other desired aesthetic element. For example, an automobile manufacturer may use a badge or symbol representing the make or model of a particular vehicle in the front and/or rear ELAs $20_H$, $20_T$ of the vehicle. Likewise, suppliers of aftermarket parts may offer light bars 32 having distinctive ornamental elements 60 as replacement parts.

Figure 3:
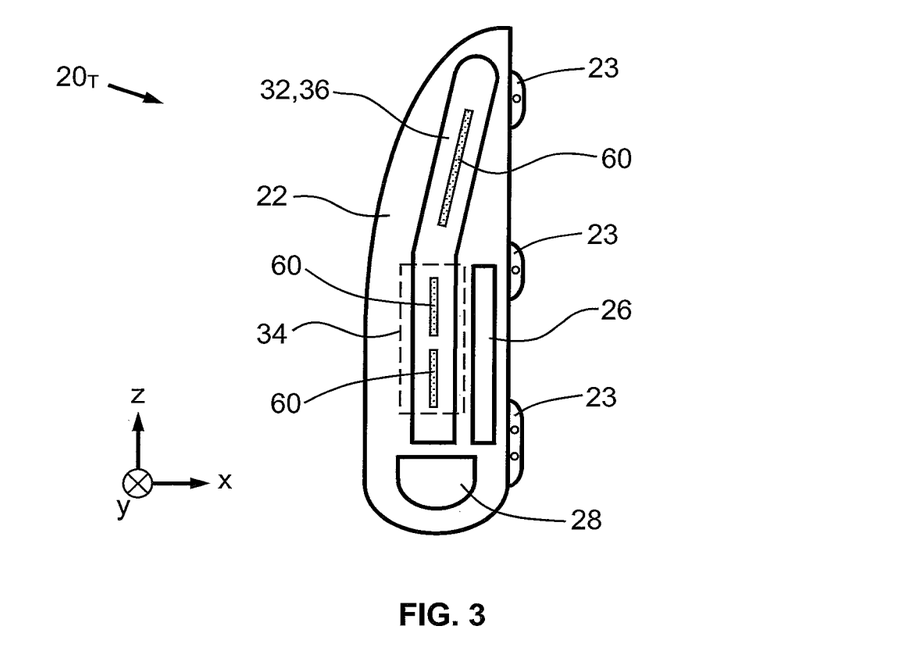
FIG. 3 is a front schematic view of a taillight exterior lighting assembly as viewed along line 3-3 of FIG. 1.
Figure 4B:
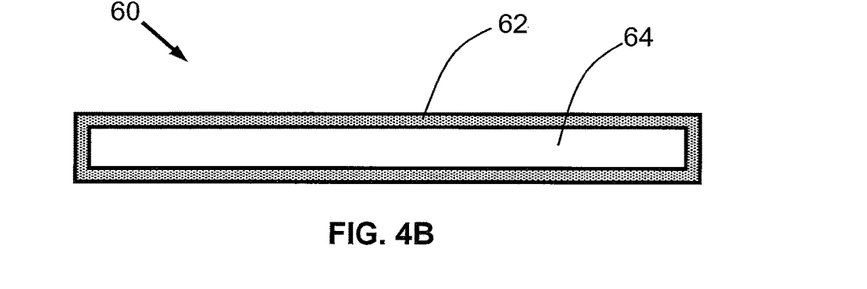
FIG. 4B is a magnified top schematic view of an ornamental element as viewed along line 4B-4B of FIG. 4A.
Figure 5A:
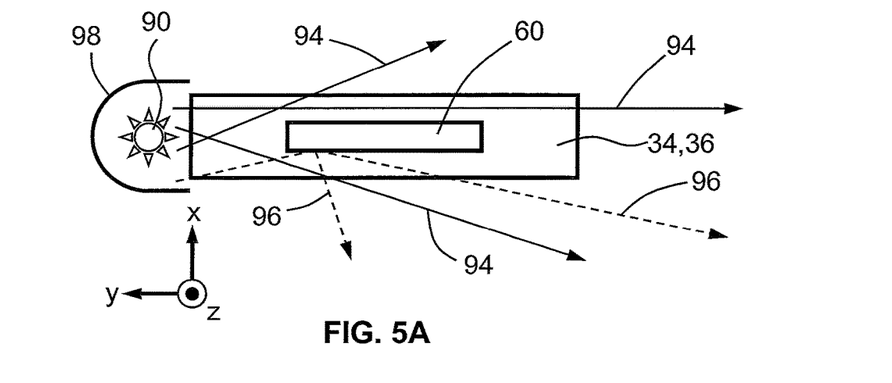
FIGS. 5A, 5B and 5C are top, front and side schematic views, respectively, of the segment of a light bar shown in FIG. 4.
Figure 5B:
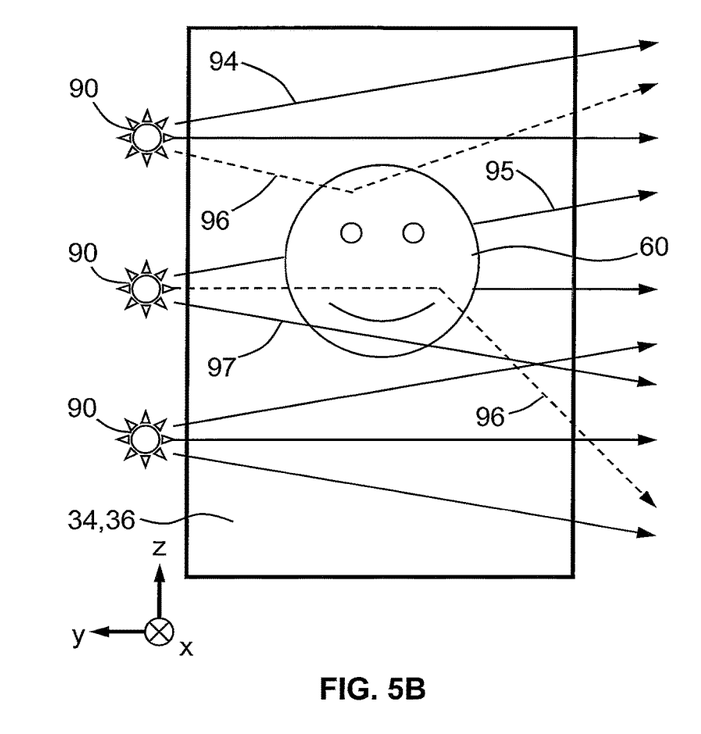
Figure 5C:
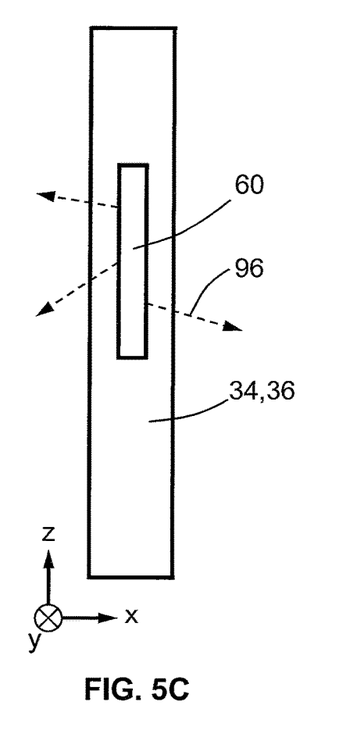

As illustrated in FIGS. 4-5, the ornamental element 60 may be sized with appropriately visible height and width dimensions in the in the z- and y-directions, respectively, but with very small thickness dimensions in the x-direction, such that the ornamental element 60 is obviously visible from side and oblique views of the light bar 32 (i.e., along the x-direction and along directions oblique to the x-direction), but along the y- and z-directions the ornamental element 60 may be more difficult to see due to its thinness. For example, if the front-left headlight ELA $20_H$ of FIG. 2 were installed on a vehicle 10, the ornamental element 60 would be easily visible from the left and right sides of the vehicle 10, but would appear very thin (and perhaps difficult to see) as viewed from a point in front of the vehicle 10 looking back rearward toward the headlight ELA $20_H$. Likewise, if the rear-left taillight ELA $20_T$ of FIG. 3 were installed on a vehicle 10, the ornamental element 60 would be easily visible from the left and right sides of the vehicle 10, but would appear very thin (and perhaps difficult to see) as viewed from a point behind the vehicle 10 looking forward toward the taillight ELA $20_T$. In other words, with the light bar 32 installed in an ELA 20 such that the slab-like shape of the light bar 32 juts or extends forward or rearward, the ornamental element 60 would be easily visible from side and perspective views of the light bar 32, but the ornamental element 60 would be difficult to see in a view from the forward or rearward views. This feature makes the ornamental element 60 much less visible to drivers in trailing vehicles looking forward/ahead at the ornamental element 60, and to drivers in leading vehicles looking backward at the ornamental element 60.

One advantage that the ornamental element 60 provides is that the scattered light 96 is not only aesthetically pleasing, but it may also serve to help meet photometry requirements for side-lighting (i.e., the provision of a certain amount of light to the side of the vehicle 10 as measured at various angles with respect to the vehicle's y-direction or forward/rearward direction). Further, the use of an ornamental element 60 capable of scattering light as described herein may enable the use of light bars 32 which are greater in width W (as measured in the vehicle's y-direction or forward/rearward direction), as compared to light bars which do not utilize such ornamental elements 60. Also note that while the ornamental element 60 is described herein as "ornamental", it may also or instead have a non-ornamental or purely perfunctory function and effect, such as advantageously scattering light in desired directions and amounts.

As further illustrated in FIGS. 4-5, some light beams 92 emitted from the light source 90 may pass right on through the substantially transparent material with substantially no deviation, like the beams denoted in FIG. 5 by reference numeral 94; meanwhile, other light beams 92 may be scattered (by the light-scattering material of the ornamental element 60), like the beams denoted by dashed lines and reference numeral 96. FIG. 5B shows a light beam passing through the substantially transparent material "behind" the ornamental element 60, denoted by reference numeral 95, and another light beam passing through the substantially transparent material "in front of" the ornamental element 60, denoted by reference numeral 97. The combination of substantially transparent material for the body portion 36 and light-scattering material for the ornamental element 60 enables most of the light 92 from the light source(s) 90 to pass right on through the light bar 32 without scattering, while light that impinges upon the ornamental element 60 is scattered. This may cause the ornamental element 60 to seemingly "glow" due to the scattered light bouncing off from the light-scattering material on its surface 62. Thus, the light bar 32 may be configured such that when light rays 92 are directed into the body portion 36 toward the ornamental element 60, a subset of the light rays 96 are incident upon the ornamental element 60 and are scattered, thus causing the ornamental element 60 to "glow" or appear brighter than the substantially transparent material surrounding the ornamental element 60.

Figure 6:
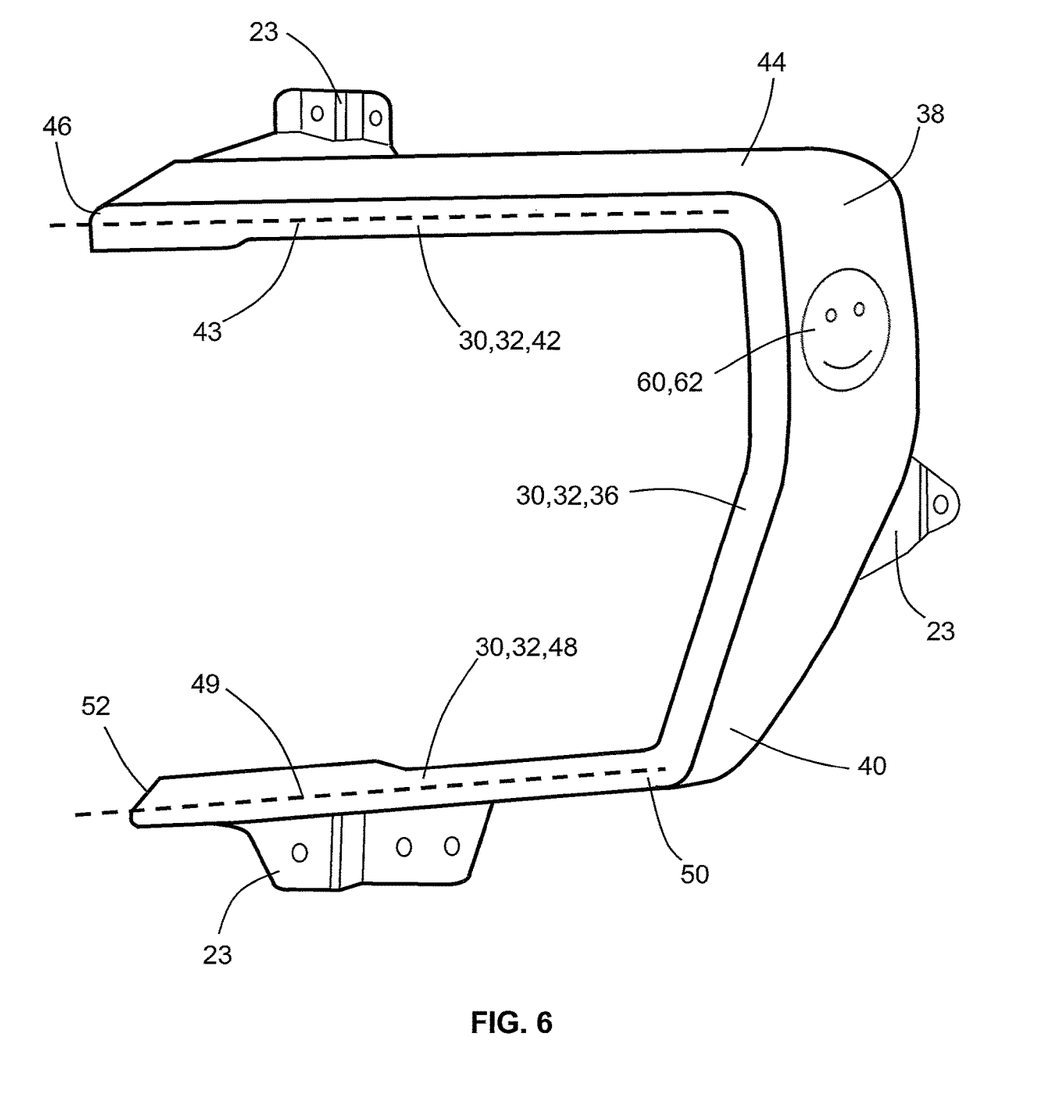
FIG. 6 is a perspective view of the light bar shown schematically in FIG. 2.
Figure 7:
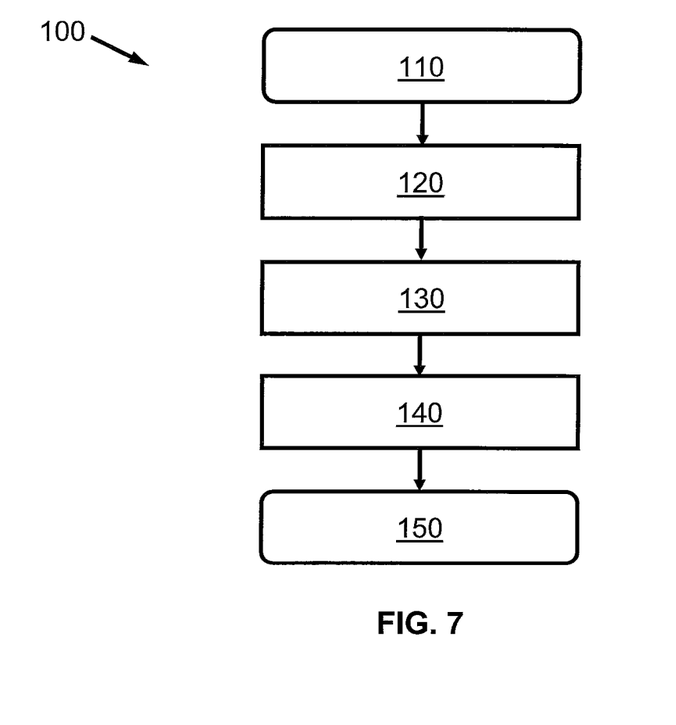
FIGS. 7 and 8 are flowcharts of two respective methods of forming a light bar for an exterior lighting assembly of an automotive vehicle.

As illustrated in FIGS. 2 and 6, the body portion 36 may have opposed upper and lower ends 38, 40 in the height H or z-direction, and the light bar 32 may further include a first wing portion 42 made of the same substantially transparent material. The first wing portion 42 may have a first longitudinal axis 43, and opposed first and second ends 44, 46 along the first longitudinal axis 43, wherein the first end 38 (of the first wing portion 42) is contiguous with the upper end 38 (of the body portion 36), and with the first longitudinal axis 43 being disposed generally in the x-direction. The light bar 32 may further include a second wing portion 48, which may be made of the same substantially transparent material as the body portion 36 and the first wing portion 42. The second wing portion 48 may have a second longitudinal axis 49 and opposed third and fourth ends 50, 52 along the second longitudinal axis 49, wherein the third end 50 (of the second wing portion 48) is contiguous with the lower end 40 (of the body portion 36), and with the second longitudinal axis 49 being disposed generally in the x-direction. For example, the headlight ELA 20$_H$ shown in FIG. 2 may be mounted to the front-left side of a vehicle 10, with the body portion 36 oriented in a generally upright orientation (i.e., running generally along or parallel to the z-direction), and with the first and second wing portions 42, 48 oriented generally horizontally (i.e., running generally along or parallel to the x-direction) and pointing toward the front grille (and also pointing toward the other headlight ELA 20$_H$ mounted on the front-right of the vehicle 10).

FIG. 3 shows a rear-left taillight ELA 20$_T$, which has a different configuration of light bar 32 compared to the headlight ELS 20$_H$ of FIG. 2. The taillight ELA 20$_T$ has a housing 22, mounting brackets 23, turn signal light 26, reverse light 28 and light bar 32. Note that whereas the light bar 32 of FIG. 2 has a "sideways U" shape and contains one ornamental element 60, the light bar 32 of FIG. 3 has somewhat of a "boomerang" shape and contains three ornamental elements 60.

Also note that reference has been made herein to "average" height, width and thickness dimensions H, W, T of the body portion 36. This is because one or more of these dimensions may vary along one or more directions. Further, note that while the average height, width and thickness dimensions H, W, T may be measured along the respective x-, y-, and z-directions or axes, they may also be measured along directions or axes that are not mutually orthogonal. For example, the somewhat "boomerang-shaped" body portion 36 and light bar 32 shown in FIG. 3 may be viewed as having a longitudinal (and generally vertical) axis that follows along the height of the light bar 32 in the z-direction, but this axis may bend where the shape of the light bar 32 bends (i.e., adjacent the top of the turn signal indicator 26). Thus, using this "bent" longitudinal axis, the height H of the light bar 32 may be a little longer than a corresponding height that is measured along a conventional (and not bent) vertical z-axis. Similarly, based on the "bent" longitudinal axis, the width W of the light bar 32 at each point along its length may be viewed as the lateral width of the light bar 32 as measured orthogonal to the bent longitudinal axis at each point. Note that the longitudinal axis of the light bar 32 may also be "bent" or "curved" in the forward and rearward directions; in fact, many automotive ELAs are not simply "planar" as illustrated by the simplified schematic diagrams of FIGS. 2 and 3, but instead may curve and undulate about all three x-, y- and z-directions. Thus, the upward/downward, leftward/rightward and forward/rearward directions may be defined for each ELA 20 and light bar 32 in accordance with its shape and orientation in 3D space.

As exemplified in FIGS. 2-3, an ELA 20 for an automotive vehicle 10 includes a housing 22, a light bar 32 and a light source 90. The light bar 32 is attached to the housing 22 and includes a body portion 36 made of a substantially transparent material and having a generally slab-like shape with an average height H in a z-direction, an average width W in a y-direction and an average thickness T in an x-direction, wherein H>W>T. The light bar 32 also includes an ornamental element 60 disposed within the body portion 36 of the light bar 32 and having an outer surface, wherein at least a portion of the outer surface 62 contains a light-scattering material. The light source 90 is attached to the housing 22 and is configured to emit visible light 92 into the body portion 36. The ELA 20 may be at least one of a headlight assembly, a brake light assembly, a turn signal light assembly, a reverse light assembly, a parking/front position light assembly and a DRL assembly. The body portion 36 may have opposed upper and lower ends 38, 40 in the z-direction, and the light bar 32 may further include a first wing portion 42 made of the substantially transparent material and having a first longitudinal axis 43 and opposed first and second ends 44, 46 along the first longitudinal axis 43, wherein the first end 44 is contiguous with the upper end 38 and the first longitudinal axis 43 is disposed generally in the x-direction. The light bar 32 may further include a second wing portion 48 made of the substantially transparent material and having a second longitudinal axis 49 and opposed third and fourth ends 50, 52 along the second longitudinal axis 49, wherein the third end 50 is contiguous with the lower end 40 and the second longitudinal axis 49 is disposed generally in the x-direction. In addition to the outer surface 62 containing light-scattering material, some or all of the interior 64 of the ornamental element 60 may also be made out of light-scattering material. The ELA's light bar 32 may be configured such that when light rays 92 are directed into the body portion 36 toward the ornamental element 60, a subset of the light rays 96 are incident upon the ornamental element 60 and are scattered, thereby causing the ornamental element 60 to "glow" or appear brighter than the substantially transparent material surrounding the ornamental element 60.

FIGS. 7-12 illustrate two related methods 100, 200 for producing a light bar 32 for an ELA 20 of an automotive vehicle 10. FIGS. 7, 9-10 and 12 illustrate a multi-shot injection molding process 100, which starts at block 110. At block 120, a first shot of a substantially transparent material is injected into a mold to form a first layer 70 of the substantially transparent material, wherein the first layer 70 has a first major surface 72 and an outer perimeter 74 about the first major surface 72. The first layer 70 may be formed in either of two ways. As illustrated in FIG. 9A, the first major surface 72 may be generally flat; or, as illustrated in FIG. 10A, the first major surface 72 may have a depression 78 or other appropriate features (e.g., bosses, indents, etc., optionally at different heights or depths) which define the shape and features of the ornamental element 60. At block 130, an ornamental element 60 (having an outer surface wherein at least a portion thereof contains a light-scattering material) is disposed on the first major surface 72 of the first layer 70 within the boundaries of the outer perimeter 74. The disposing step of block 130 may be implemented in either of two ways. As shown in FIG. 9B, the ornamental element 60 may be deposited onto a generally flat first major surface 72, such as by injecting a shot of molten light-scattering material onto the surface 72 (and constrained within an appropriate die half of the mold) to form the ornamental element 60; alternatively, the disposing step may include placing a pre-made ornamental element 60 into position on the surface 72 (e.g., by robotic placement). In the latter of these two approaches, the ornamental element 60 may be in solid form (as opposed to molten form, as in the former approach), wherein the ornamental element 60 is formed previously and separately (i.e., in a different mold or mold cavity). As shown in FIG. 10B, the ornamental element 60 may either be injected into the depression 78 in molten form or placed into the depression 78 in pre-made solid form. At block 140 and as illustrated in FIGS. 9C and 10C, a second shot of the substantially transparent material is injected into the mold to form a second layer 76 of the substantially transparent material covering the ornamental element 60 and in contact with the first major surface 72 (thereby completely encapsulating the ornamental element 60 within the substantially transparent material). Finally, at block 150, the method 100 is completed. Note that although a mold is not shown in the drawings, a mold having appropriate size, shape, dimensions and features would be capable of producing the layers 70, 76 and sequences illustrated in the drawings.

Figure 8:
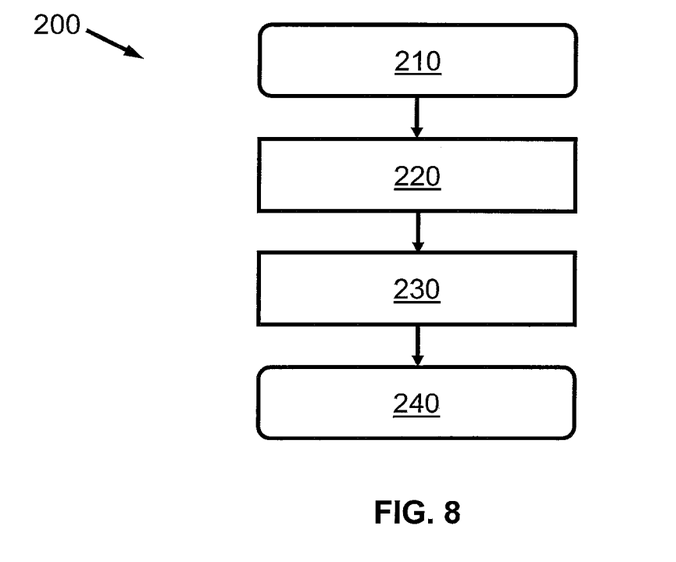
Figure 9A:
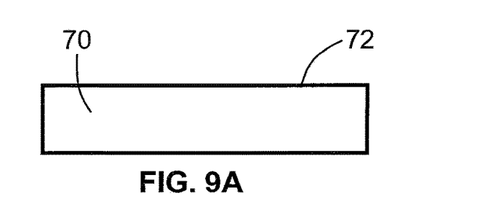
FIGS. 9A, 9B and 9C are front schematic views illustrating a build-up of layers for forming a light bar according to the method of FIG. 7.
Figure 9B:
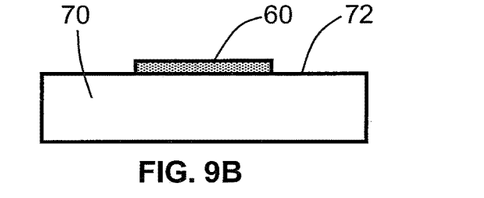
Figure 9C:
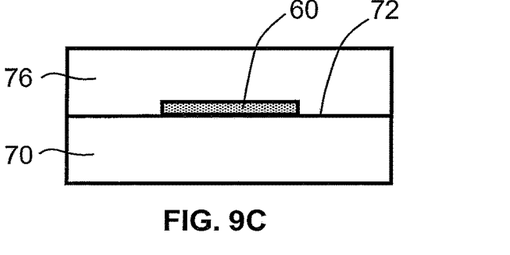
Figure 10A:
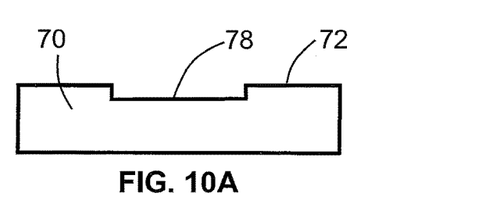
FIGS. 10A, 10B and 10C are front schematic views illustrating an alternative build-up of layers for forming a light bar according to the method of FIG. 7.
Figure 10B:
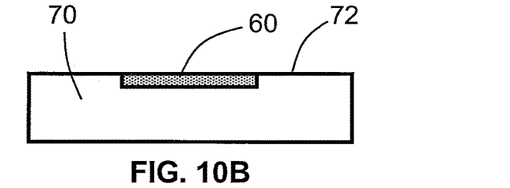
Figure 10C:
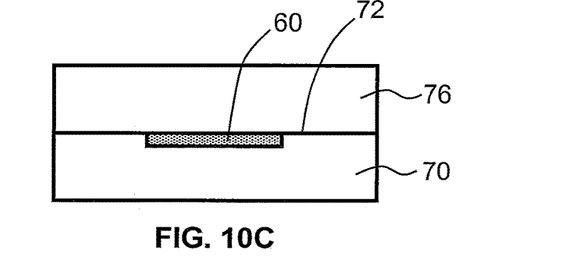
Figure 11A:
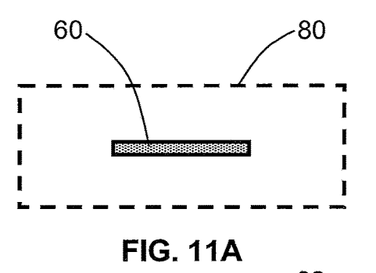
FIGS. 11A and 11B are front schematic views illustrating steps for forming a light bar according to the method of FIG. 8.
Figure 11B:
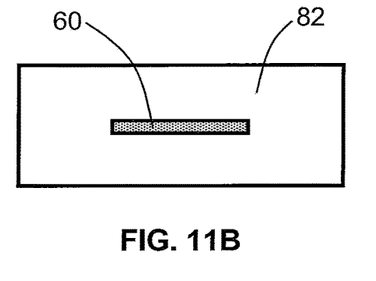
Figure 12:
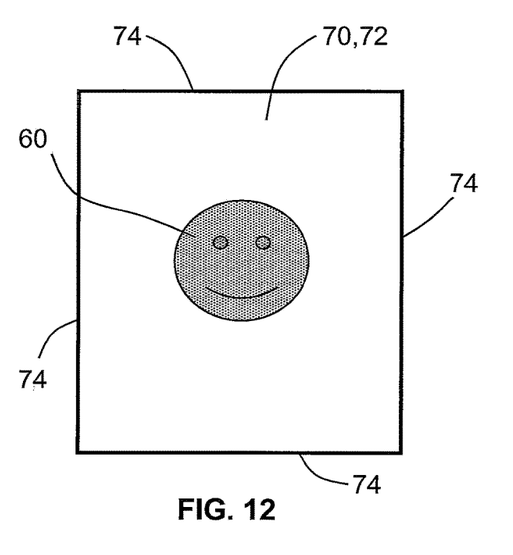
FIG. 12 is a top schematic view of the first layer and ornamental element of FIG. 9B.

FIGS. 8 and 11 illustrate an alternative method 200 of forming a light bar 32 for an exterior lighting assembly 20 of an automotive vehicle 10, which starts at block 210. At block 220, an ornamental element 60 (having an outer surface wherein at least a portion of the outer surface contains a light-scattering material) is disposed within a mold or mold cavity. (Reference numeral 80 indicates an outer envelope of the mold or mold cavity.) The ornamental element 60 may be injected in place in molten form within the outer envelope 80 of the mold (such as within a first mold cavity that is smaller than and positioned within the overall outer envelope 80), or the ornamental element 60 may be placed into the mold in pre-made solid form. If the ornamental element 60 is placed into the mold in solid form, one edge of the ornamental element 60 may be held or gripped by the mold to hold the ornamental element 60 in the desired position. At block 230, substantially transparent material is injected into the mold to substantially encapsulate the ornamental element 60 within a surrounding layer 82 of the substantially transparent material, and at block 240 the method 200 is completed. If the ornamental element 60 is injected in molten form, or if it is placed into the mold in pre-made solid form without the mold gripping or holding one edge of the ornamental element 60, then it may be positioned completely within the outer envelope 80 of the mold and the surrounding layer 82 of substantially transparent material may completely encapsulate the ornamental element 60. However, if the ornamental element 60 is placed in the mold in pre-made solid form and the mold grips or holds an edge of the ornamental element 60, then all of the ornamental element 60 except for the edge (and perhaps some small portion of the ornamental element 60 immediately adjacent to the edge) may be encapsulated by the substantially transparent material. Note that although a mold is not shown in FIG. 11, a mold having appropriate size, shape, dimensions and features would be capable of correctly positioning the ornamental element 60 and producing the surrounding layer 82 of substantially transparent material exemplified in the drawings.

The above description is intended to be illustrative, and not restrictive. While various specific embodiments have been presented, those skilled in the art will recognize that the disclosure can be practiced with various modifications within the spirit and scope of the claims. For example, while the dimensions and types of materials described herein are intended to be illustrative, they are by no means limiting and are exemplary embodiments. Moreover, in the following claims, use of the terms "first", "second", "top", "bottom", "upper", "lower", and the like are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Furthermore, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, such as in the phrase "substantially transparent", these adverbs mean "for the most part", "to a significant extent" and/or "to a large degree", and do not necessarily mean "perfectly", "completely", "strictly" or "entirely".

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A light bar, comprising:
    a body portion made of a substantially transparent material and having a generally slab-like shape with an average height H in a z-direction, an average width W in a y-direction and an average thickness T in an x-direction wherein the x-, y- and z-directions are mutually orthogonal and H>W>T; and
    an ornamental element disposed within the body portion and having an outer surface surrounding an interior, wherein substantially all of the outer surface contains a light-scattering material and the interior is devoid of the light-scattering material.

2. A light bar according to claim 1, wherein the substantially transparent material is at least one of a polycarbonate, a polymethylmethacrylate and an acrylic.

3. A light bar according to claim 1, wherein the light-scattering material is at least one of talc, titanium dioxide, styrene-acrylonitrile, polyethylene terephthalate, and a combination of any of the foregoing and at least one of polycarbonate and polymethylmethacrylate.

4. A light bar according to claim 1, wherein the light bar is configured for use in an exterior lighting assembly for an automotive vehicle, wherein is the exterior lighting assembly is at least one of a headlight assembly, a brake light assembly, a turn signal light assembly, a reverse light assembly, a parking/front position light assembly and a daytime running light assembly.

5. A light bar according to claim 1, wherein the interior is made of at least one of the substantially transparent material, a second substantially transparent material different from the substantially transparent material of which the body portion is made, and an opaque material.

6. A light bar according to claim 1, wherein outer surface completely encapsulates the interior.

7. A light bar according to claim 1, wherein the body portion has opposed upper and lower ends in the z-direction, the light bar further comprising a first wing portion made of the substantially transparent material and having a first longitudinal axis and opposed first and second ends along the first longitudinal axis, wherein the first end is contiguous with the upper end and the first longitudinal axis is disposed generally in the x-direction.

8. A light bar according to claim 7, further comprising a second wing portion made of the substantially transparent material and having a second longitudinal axis and opposed third and fourth ends along the second longitudinal axis, wherein the third end is contiguous with the lower end and the second longitudinal axis is disposed generally in the x-direction.

9. A light bar according to claim 1, wherein the light bar is configured such that when light rays are directed into the body portion toward the ornamental element, a subset of the light rays are incident upon the ornamental element and are scattered so as to cause the ornamental element to appear brighter than the substantially transparent material surrounding the ornamental element.

10. An exterior lighting assembly for an automotive vehicle, comprising:
  a housing;
  a light bar attached to the housing and including:
    a body portion made of a substantially transparent material and having a generally slab-like shape with an average height H in a z-direction, an average width W in a y-direction and an average thickness T in an x-direction wherein the x-, y- and z-directions are mutually orthogonal and H>W>T, and
    an ornamental element disposed within the body portion and having an outer surface surrounding an interior, wherein substantially all of the outer surface contains a light-scattering material and the interior is devoid of the light-scattering material; and
  a light source attached to the housing and configured to emit visible light into the body portion.

11. An exterior lighting assembly according to claim 10, wherein the exterior lighting assembly is at least one of a headlight assembly, a brake light assembly, a turn signal light assembly, a reverse light assembly, a parking/front position light assembly and a daytime running light assembly.

12. An exterior lighting assembly according to claim 10, wherein the body portion has opposed upper and lower ends in the z-direction, the light bar further comprising a first wing portion made of the substantially transparent material and having a first longitudinal axis and opposed first and second ends along the first longitudinal axis, wherein the first end is contiguous with the upper end and the first longitudinal axis is disposed generally in the x-direction.

13. An exterior lighting assembly according to claim 10, wherein the light bar is configured such that when light rays are directed by the light source into the body portion toward the ornamental element, a subset of the light rays are incident upon the ornamental element and are scattered so as to cause the ornamental element to appear brighter than the substantially transparent material surrounding the ornamental element.

14. An exterior lighting assembly according to claim 10, wherein the interior is made of at least one of the substantially transparent material, a second substantially transparent material different from the substantially transparent material of which the body portion is made, and an opaque material.

15. An exterior lighting assembly according to claim 10, wherein the outer surface completely encapsulates the interior.

16. A method of forming a light bar, comprising:
  injecting a first shot of a substantially transparent material into a mold to form a first layer of the substantially transparent material, wherein the first layer has a first major surface and an outer perimeter about the first major surface;
  disposing an ornamental element on the first major surface within the outer perimeter, the ornamental element having an outer surface surrounding an interior wherein substantially all of the outer surface contains a light-scattering material and the interior is devoid of the light-scattering material; and
  injecting a second shot of the substantially transparent material into the mold to form a second layer of the substantially transparent material covering the ornamental element and in contact with the first major surface so as to form a body portion made of the substantially transparent material and having a generally slab-like shape with an average height H in a z-direction, an average width W in a y-direction and an average thickness T in an x-direction wherein the x-, y- and z-directions are mutually orthogonal and H >W >T, and wherein the ornamental element is disposed within the body portion.

17. A method according to claim 16, wherein the disposing step comprises injecting a shot of the light-scattering material into the mold to form the ornamental element.

18. A method according to claim 16, wherein the disposing step comprises placing the ornamental element in solid form on the first major surface within the outer perimeter, wherein the ornamental element is formed separately from the mold.

19. A method according to claim 16, wherein the interior is made of at least one of the substantially transparent material, a second substantially transparent material different from the substantially transparent material of which the first and second layers are made, and an opaque material.

20. A method according to claim 16, wherein the outer surface of the ornamental element completely encapsulates the interior of the ornamental element.

* * * * *